United States Patent [19]
Hitz

[11] 4,159,132
[45] Jun. 26, 1979

[54] SEALED CONNECTION

[76] Inventor: Gifford L. Hitz, 1661 Bel Air Rd., Los Angeles, Calif. 90024

[21] Appl. No.: 892,745

[22] Filed: Apr. 3, 1978

[51] Int. Cl.$^2$ ................... F16L 21/06; F16L 23/00
[52] U.S. Cl. ........................... 285/39; 285/90;
285/336; 285/363; 285/373; 285/421
[58] Field of Search ............ 285/373, 421, 419, 382.2,
285/382, 39, 90

[56]     References Cited
U.S. PATENT DOCUMENTS

| | | | |
|---|---|---|---|
| 591,828 | 10/1897 | Duncan | 285/373 X |
| 969,943 | 9/1910 | Cronholm | 285/421 |
| 1,725,713 | 8/1929 | Jobe | 285/419 X |
| 2,338,307 | 1/1944 | Staggers | 285/373 X |
| 2,341,629 | 2/1944 | Kreidel | 285/382 X |
| 2,818,055 | 12/1957 | Hovde | 285/373 X |
| 3,149,860 | 9/1964 | Hallesy | 285/421 X |
| 3,687,487 | 8/1972 | Lindholm | 285/373 X |

FOREIGN PATENT DOCUMENTS

| | | | |
|---|---|---|---|
| 528039 | 10/1972 | Switzerland | 285/373 |
| 866626 | 4/1961 | United Kingdom | 285/373 |

*Primary Examiner*—Thomas F. Callaghan
*Attorney, Agent, or Firm*—William W. Haefliger

[57]     ABSTRACT

A sealed connection for two cylindrical members includes semi-cylindrical connector sections sized to fit about the members, to bridge the joint between the members, and to be retained in position. An over-center flexing seal is also provided between two such members, as for example pipe members.

9 Claims, 14 Drawing Figures

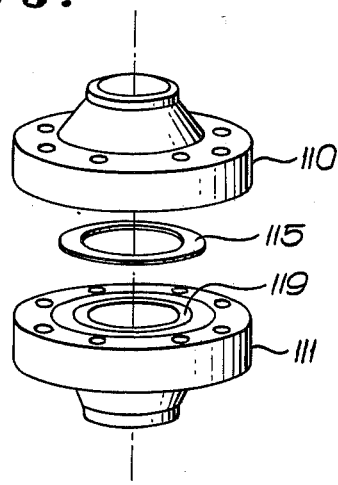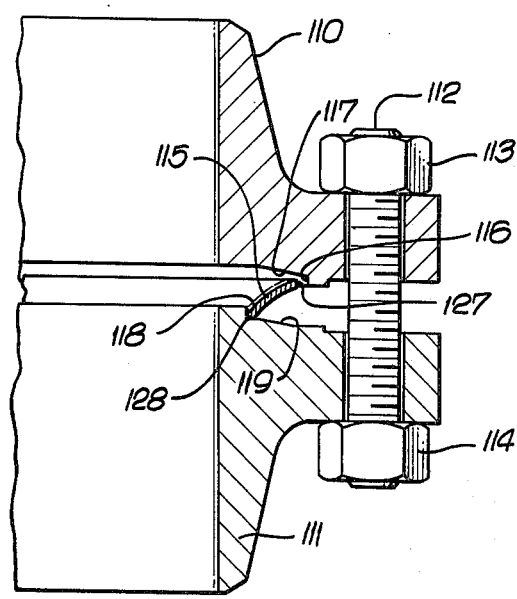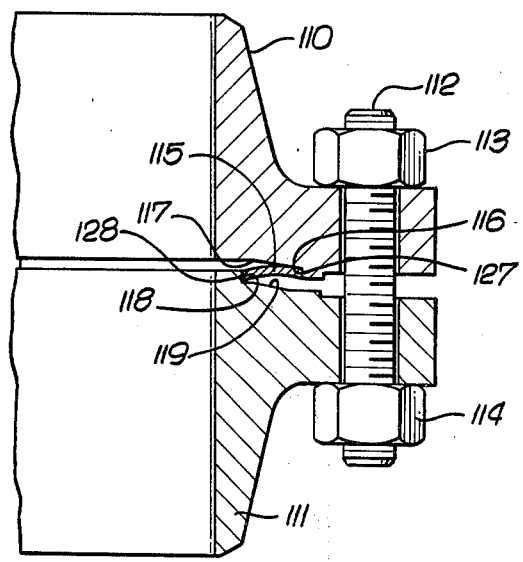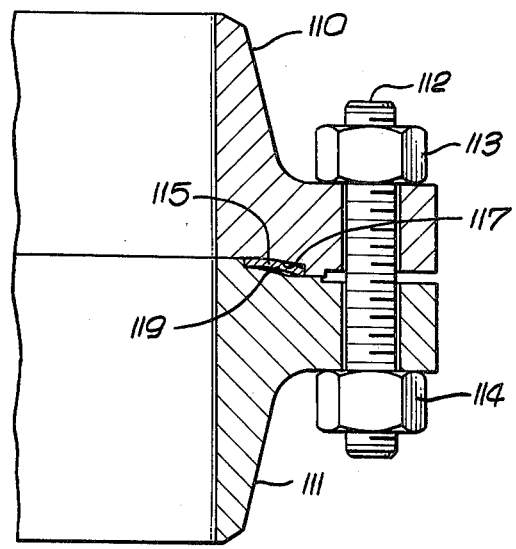

SEALED CONNECTION

BACKGROUND OF THE INVENTION

This invention relates generally to high pressure joints of a size and configuration which because of the nature of the piping or vessel layout cannot be screwed together as would be done with a standard coupling, and more particularly concerns improvements in joining sections of piping or pressure vessels in high pressure and temperature service which can by use of this invention be coupled and uncoupled, as need requires, without rotating either member of the assembly.

Past efforts to effect such joints have been directed toward the use of standard or special bolted flanges, or by flanged members drawn together by bolted members, or by threaded members which must be rotated to be drawn up, or by a combination of these, as in a common pipe union.

In many instances such past efforts have proved unsatisfactory, due to the tendency of such equipment, or some portion thereof, to yield or creep under pressure or temperature conditions, largely because the stresses imposed on the retaining bolting or the keeper clamps, these members being dimensionally relatively long, which results in the normal stretch of the restraining member becoming cumulatively excessive. As a result, leakage can and does occur.

SUMMARY OF THE INVENTION

The present invention has for its major object the provision of a reliable compact means for joining two sections of piping or pressure vessels in such a manner that the sections can be joined or separated, as required, quickly and effectively, by such means as will circumvent or eliminate the prior problems mentioned above, as well as others.

Basically, the connection for two cylindrical member comprises:

(a) at least two semi-cylindrical connector sections sized to fit about said members, said sections forming projections that extend radially inwardly and generally annularly about said axis, said projections spaced apart in an axial direction on each of the sections for meshing interengagement with corresponding projections on the members that project radially outwardly, with said sections bridging the joint between said members, whereby the members are held against relative axial separation, and (b) generally annular retaining ring means extending anularly about said sections and having wedging engagement therewith to block outward movement of the sections that would tend to relieve said meshing interengagement.

As will be seen, one or two retaining rings may be employed, with tapered bore configurations; they may be interlocked to the coupling sections for safety; and seal means may be employed between the member ends to be energized as the coupling sections are made up in meshing relation to the members; and clamp means may be employed to urge the members endwise together to permit meshing of the coupling sections to the members.

Another aspect of the invention relates generally to leak-proof seals and more particularly concerns improvements in sealing piping assemblies and pressure vessels subjected to varying pressures and temperature conditions, including high pressure and elevated temperature service, as well as that service which is cyclic in nature. In this regard, past efforts to seal off flanged pipe or pressure vessel connections have been directed toward the use of sealing devices such as the sharply pointed "delta ring", the wave ring, simple metal or rubber O-rings, and a variety of E-rings, K-rings and similar rings purporting to be pressure energized. In many instances such past methods have proved unsatisfactory due to the fact that undesirably fine surface finishes and close tolerances in machining are required, and also because of the deterioration of the seals in service.

The present invention accordingly has for an additional object the provision of a reliable and permanent means for sealing heavy duty connections in such manner as will circumvent or eliminate the prior problems mentioned above, as well as others. Basically, the improved seal construction comprises a pair of bodies extending in face to face relation and having walls forming opposite grooves sunk in the body faces, the grooves configured to form opposing pockets suitable for containing a metallic sealing annulus, which flexes in over center relation and which, in final position, is at about 90° to the axis of the bodies, or slightly beyond. Finally, the metallic annulus, being slightly concave in unflexed cross section, is additionally deformable under increasing pressure to further urge the inner and outer edges of the annulus against the walls of the pockets in the bodies. As a result, the seal assembly is mobile and the sealing effect is improved as the bodies move slightly apart under the influence of heat and pressure. In addition, the construction is such that any minor misalignment or inaccuracy in fit-up, is compensated for by an ability of the concave cross section to make an effective seal under varying degrees of curvature.

These and other objects and advantages of the invention, as well as the details of illustrative embodiments, will be more fully understood from the following detailed description of the drawings, in which:

DRAWING DESCRIPTION

FIG. 8 is an exploded view showing a pipe assembly equipped with a seal assembly incorporating the invention;

FIG. 9 is an enlarged section in elevation showing a seal set into position in one of the bodies to be connected. (The other body has not yet been drawn up into position);

FIG. 10 is a similar to FIG. 2 showing the seal ring being trapped between the opposing annular pocket faces of the two bodies;

FIG. 11 is a view similar to FIG. 10 showing the two bodies drawn together into intimate contact;

DETAILED DESCRIPTION

Figure 1:
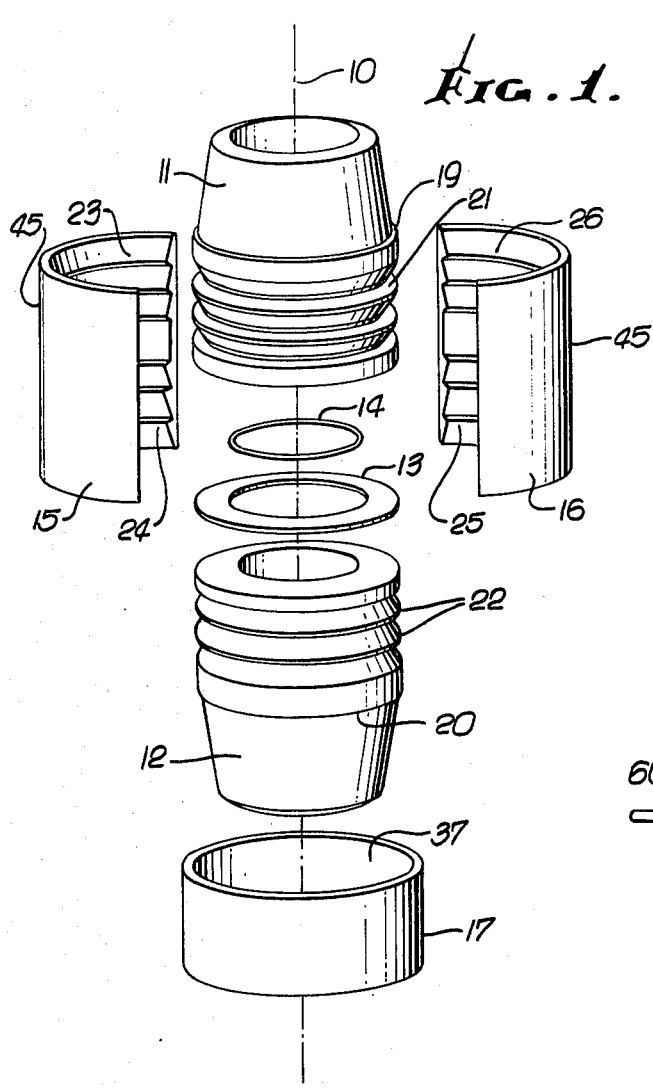
FIG. 1 is an exploded perspective showing a heavy duty piping assembly incorporating the invention.
Figure 2:
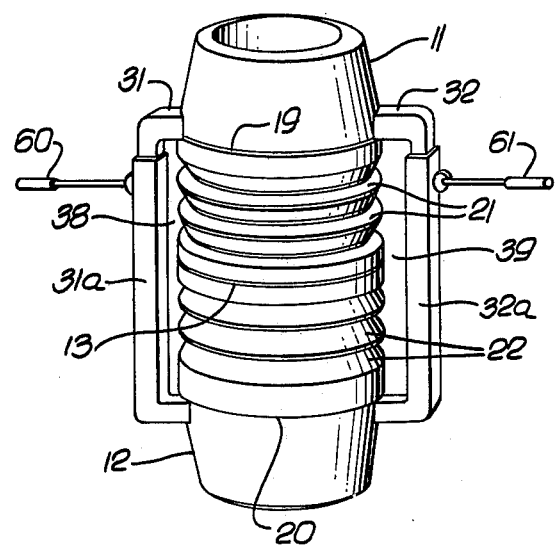
FIG. 2 is a view showing the two main bodies clamped together with a gasket between them.

In FIGS. 1 and 2, the sealed connection or assembly includes two cylindrical members 11 and 12 such as high pressure pipe or fitting members defining a common axis 10. At least two semi-cylindrical connector or coupling sections as at 15 and 16 are provided and sized to fit about the members 11 and 12. More than two such sections may be used.

The sections 15 and 16 form projections, as at 23 and 24 on section 15 and at 25 and 26 on section 16. See also FIGS. 5, 6 and 7. Such projections extend radially inwardly and generally annularly about axis 10; also they are spaced apart in an axial direction on each section for meshing interengagement with corresponding projections 22 and 21 on the respective ends of the fittings or pipe members 12 and 11. Projections 22 and 21 are also annular and they project radially outwardly.

Figure 5:
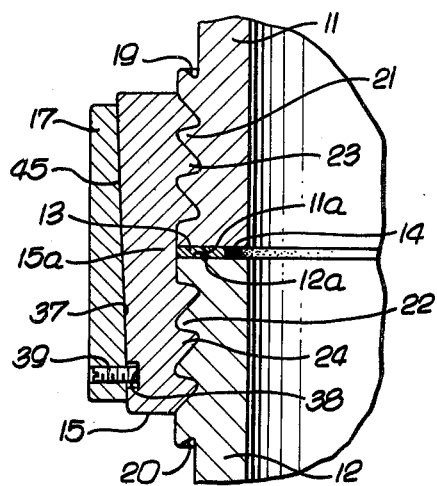
FIG. 5 is an enlarged fragmentary section showing in detail the relative positions of the main bodies, the coupling sections, and the retaining keeper.
Figure 6:
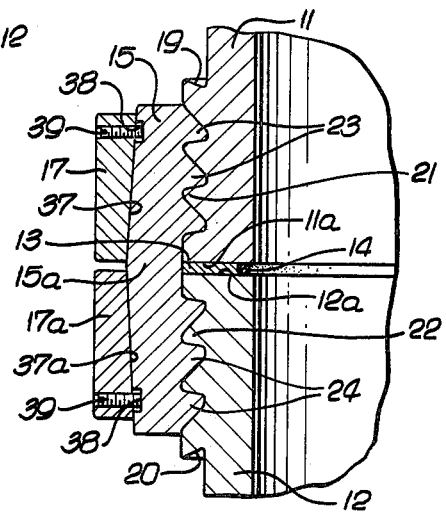
FIG. 6 is a view like FIG. 5, but showing a modification.
Figure 7:
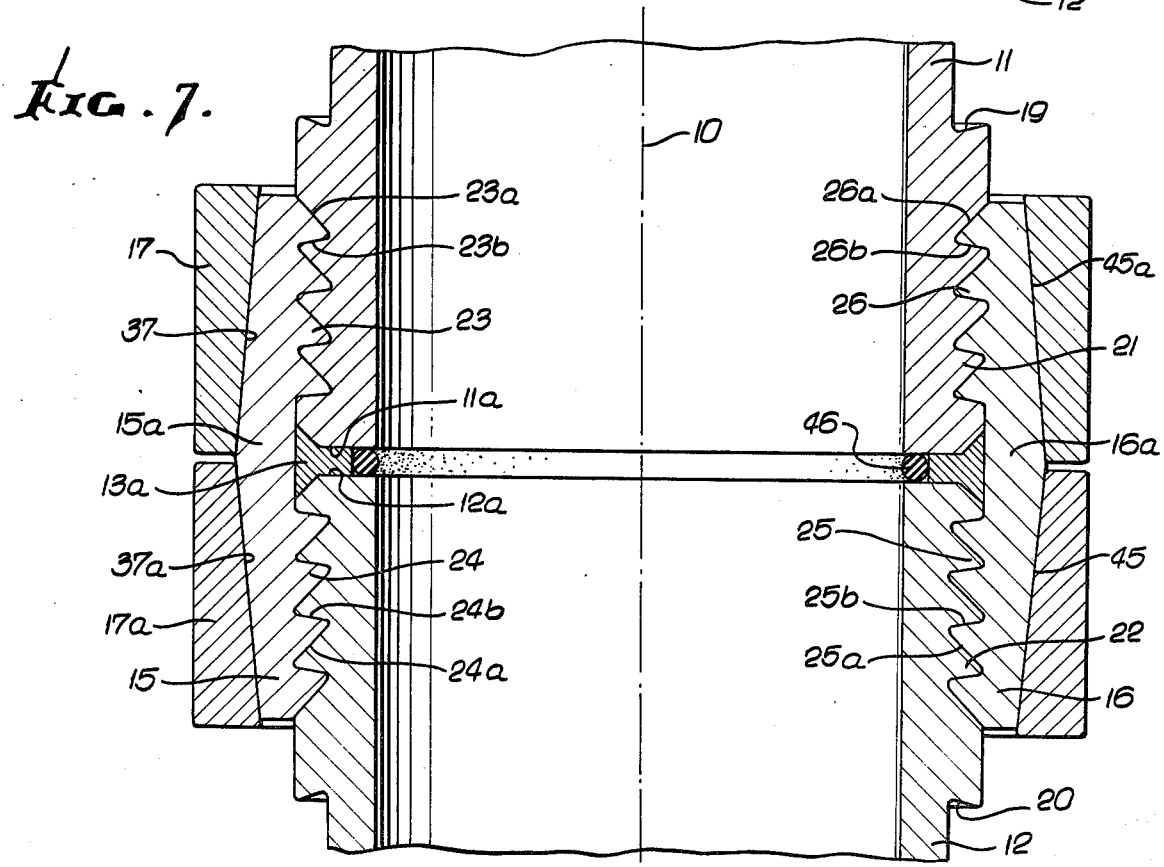
FIG. 7 is a view like FIG. 6, but showing another modification.

In fully assembled connection, the sections 15 and 16 bridge the joint between the members 11 and 12 as is clear from FIGS. 5, 6 and 7. Note for example the section mid-portion 15a between the projections 23 and 24, 16a between the projections 25 and 26.

Note that certain projections, as at 23 and 26 on the sections 15 and 16, have first annular flanks 23a and 26a which face away from the joint area 52, such flanks angled radially inwardly and in one direction toward the joint area. Those projections also have second and opposite flanks as at 23b and 26b which face toward the joint and extend generally radially inwardly. Other projections as at 24 and 25 on the sections 15 and 16 have first annular flanks 24a and 25a which also face away from the joint area, such flanks angled radially inwardly and in the opposite axial direction toward the joint area. Those projections also have second flanks as at 24b and 25b which face toward the joint and extend generally radially inwardly. As a result, the projections on the sections 15 and 16 cam on the corresponding projections on the pipe members, to urge or draw such members endwise relatively together, as the coupling sections are displaced radially inwardly upon assembly. Flanks 23a and 24a, 25a and 26a may advantageously extend at about +45° from planes normal to axis 10, as seen in FIG. 7; and flanks 23b, 24b, 25b and 26b may advantageously extend at about −5° from such planes, for unusually satisfactory results. The angles of flanks 23a, 24a, 25a and 26a from such planes are shown as positive angles and substantially greater in absolute value from the −5° angularity of flanks 23b-26b from such planes.

Figure 4:
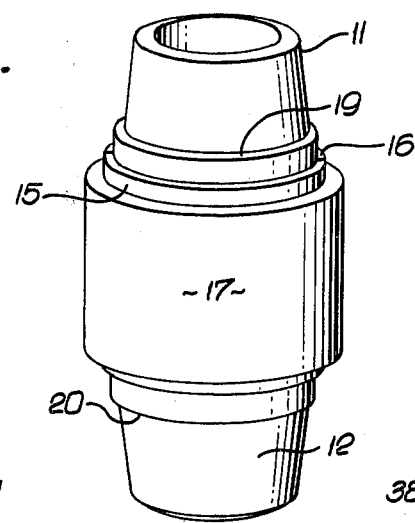
FIG. 4 is a view showing the completed assembly with a keeper ring drawn down over the assembly.

Also provided is generally annular retaining ring means extending annularly about the sections 15 and 16, and having wedging engagement therewith, to block outward movement of the sections that would tend to relieve the meshing interengagement referred to, or that would tend to relieve the seal established between the ends of the members, as will be described. As shown in FIGS. 1, 4 and 5, the retaining ring means includes a ring 17 having an axially tapering bore 37, and the sections 15 and 16 have outer surfaces at 45 which are axially tapered to fit the ring bore. Therefore, as the ring is displaced axially into wedging engagement with the sections, they are urged inwardly as to the position illustrated. An adjustable tongue and groove connection may be provided between the ring and the sections to lock them together for safety. See for example the keepers such as set screw 39 threaded into the ring 17 for end reception in the grooves 38 in the sections 15 and 16.

FIGS. 6 and 7 show two rings 17 and 17a having bores 37 and 37a which taper in axially opposite directions; and the sections have outer surfaces which also taper in axially opposite directions to fit the tapered ring bores.

Sealing means is also provided at the joint between the members 11 and 12 when the sections 15 and 16 are assembled to member as described. Such seal or gasket means is shown to include an annular metallic ring as at 13 in FIGS. 5 and 6, and at 13a in FIG. 7. Note the member ends 11a and 12a compressively seating against the metal ring 13 or 13a. FIG. 7 also shows use of a non-metallic O-ring 46 engaging the pipe ends 11a and 12a radially inwardly of ring 13a to also seal against the latter as fluid pressure rises within the joint. Rings 13 and 13a are sized to fit against the pipe ends with predetermined sealing pressure as the connection elements are made up, as described.

The members also have external shoulders as at 19 and 20, which face axially oppositely away from the joint to receive application of clamping force acting to urge the members endwise together, to allow full meshing as described. A clamp means, such as C-clamp elements 31, 32, 31a and 32a, is operable to engage such shoulders or edges to urge the members toward one another. The clamp means may be suitably actuated, as via levers 60 and 61 which are pivotally attached to the clamps and operable, as via jack structure for example, to displace the clamp parts 31 and 32 toward parts 31a and 32a, or retract same for removal off the shoulders.

Figure 3:
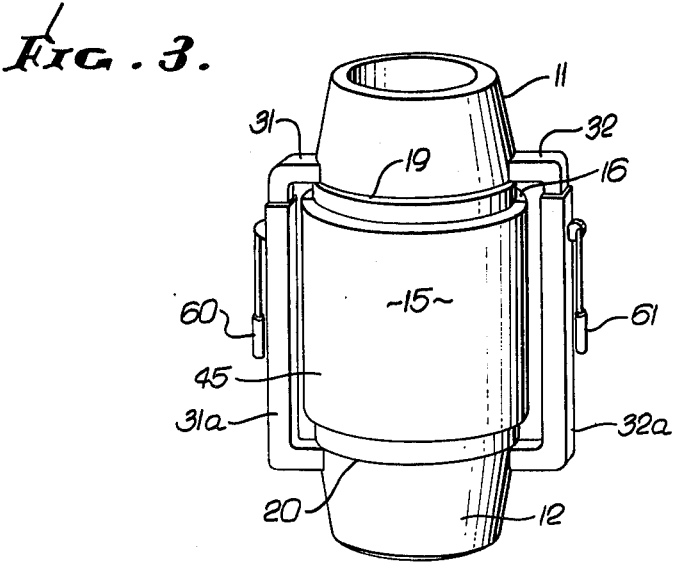
FIG. 3 is a view showing coupling sections positioned inwardly of the clamps.

FIG. 3 illustrates the piping assembly with the two body members 11 and 12 being drawn together by a pair of clamps locked into ledges 19 and 20 of the pipe or body members, and with the gasket spacer ring 13 and the elastomer O-ring 14 centrally located between the two body members. FIG. 3 also illustrates the assembly with the grooved coupling members 15 and 16 slid into position around the main bodies 11 and 12, in the clearance spaces 38 and 39 between the clamps and the main bodies.

FIG. 4 illustrates the completed assembly showing retaining ring 17 drawn over the coupling members 15 and 16.

FIG. 5 is an enlarged cross section showing the exact relationship between body members 11 and 12, and gasket assembly 13 and 14, and grooved coupling member 15, and the retaining keeper 17. The stresses set up in service by pressure, temperature, and mechanical bending, torsional or longitudinal, are evenly and adequately carried by all mated projections, and since the total cross sectional area of the keeper ring and the grooved coupler member is greater than that of the adjoining piping, any actual bending in service will occur in the less thick areas of the adjoining piping.

It should be pointed out that inasmuch as the distance between the first groove adjacent to the face of each member is substantially less than that of the retaining surfaces provided by presently available flanges, flanged couplings or non-rotating threaded connections, the cumulative lengthening due to stress in service is correspondingly substantially reduced, eliminating a principal cause of leakage in service. Moreover, because the stresses caused by pressure and temperature are evenly distributed, in this invention, over a number of grooves and in turn by a uniform area in the coupling members and retaining ring, a considerable saving in diametric dimension and material required for the assembly, is possible.

Referring now to FIGS. 8-11, a high pressure piping assembly is shown to include two flanges 110 and 111, with face to face grooves 119 and 117, with opposing annular pockets 116 and 118. The annular metallic sealing member 115, as pre-formed, has a somewhat conical shape in uniflexed condition and is slightly concave in cross sections taken in axial radial planes. As flanges 110 and 111 are brought together by the action of the bolting, 112, 113 and 114, the outer and inner edges 127 and 128 of the sealing ring 115 are brought into contact with shoulders of faces 116 and 118 of grooves or recesses 117 and 119. As the flanges are brought closer together, the concave section of the annular sealing ring allows it to bow slightly. This flexing is advantageous in two respect; first, it allows a relatively uniform pressure to be exerted by annular edges 127 and 128 against shoulders 116 and 118, and second, should there be a slight misalignment of flanges 110 and 111, such flexing allows the pressure to remain adequate, although not uniform.

Figure 12:
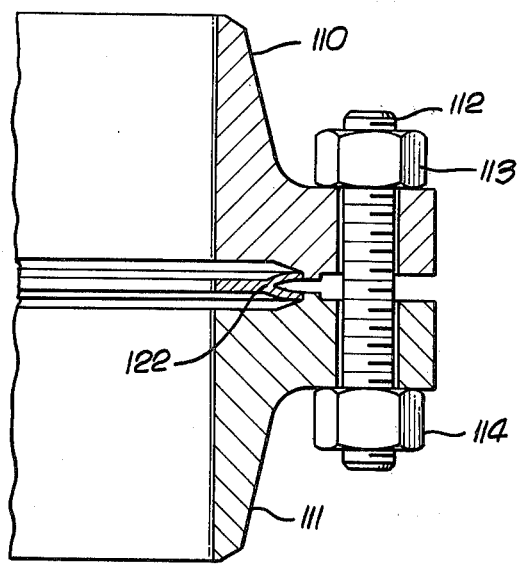
FIGS. 12 and 13 illustrate variations in the configuration of the annular sealing ring and the grooves in the two bodies, but each showing the same "over-center" characteristic of the seal.

In FIG. 12, T section sealing ring 122 is in effect the equivalent of two rings like ring 115, the inner pocket of the assembly being replaced by a heavy inner stem section of the sealing ring. It is not necessary, here, to provide a male and female set of pipe flanges, as both flanges are identical.

Figure 13:
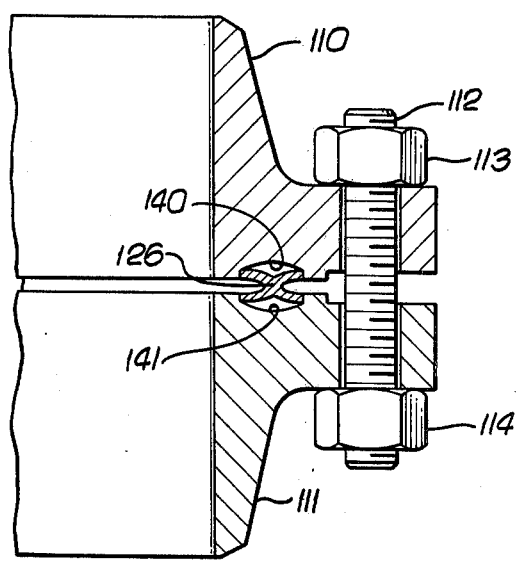

In FIG. 13, again, X cross section sealing ring 126 is the equivalent of two sealing rings 115 of FIGS. 8-11. The advantage of this type of ring is that the outer seal is protected against erosion and corrosion by the inner seal. Note inward facing shoulders on the pipe flanges engaged by the outward facing edges of the seal ring, and outward facing shoulders on the pipe flanges engaged by the inward facing edges of the seal ring. Pockets 140 and 141 are formed in the pipe ends to receive the four edges of the ring, as described.

Figure 14:
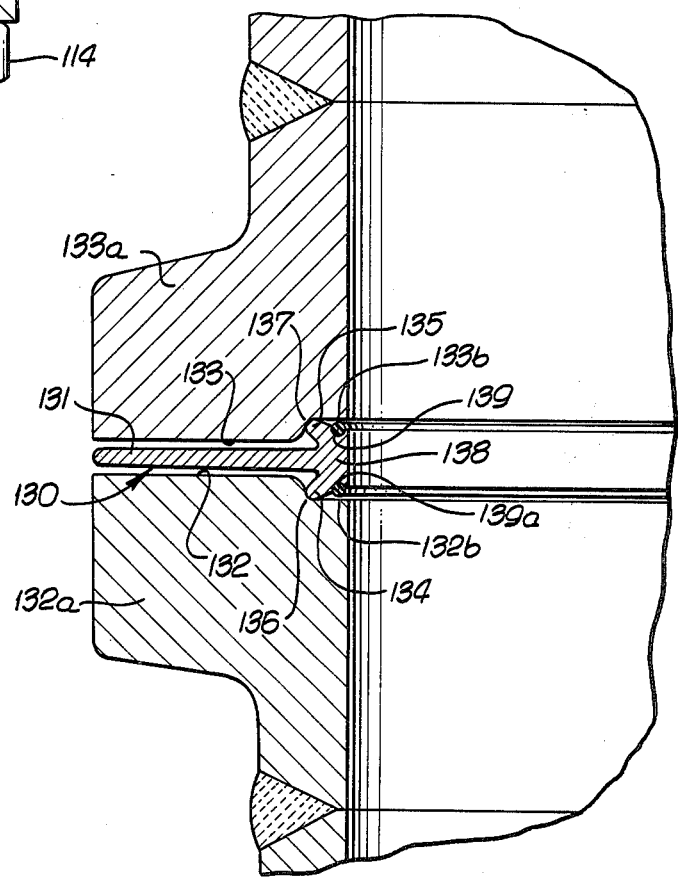
FIG. 14 is a section in elevation showing a further modification.

FIG. 14 also shows a T-cross section seal ring 130, with a stem 131 projecting radially outwardly between flange ends 132 and 133. The metallic ring has outward facing edges 134 and 135 that tightly engage pipe shoulders 136 and 137 in response to closing together movement of the flanges 132a and 133a. The annular head or body 138 of the ring tapers toward the pipe axis, and it may carry O-rings 139 and 139a to seal against the pipe end offset surfaces 132b and 133b.

From what has been described, it is clear that the sealed connection for the two pipe members comprises (a) a generally radially facing first annular shoulder at the end of one of the pipe members, and a generally radially facing second annular shoulder at the end of the other of the pipe members, said pipe member ends closely facing one another axially, (b) and an annular, diaphragm type metallic seal having one edge adjacent said first shoulder and another edge adjacent said other shoulder, said seal having arcuate cross sections in axial radial planes and extending between said two edges, whereby relative closing together of the pipe ends effects over-center flexing of the seal extending between said shoulders to tightly and annularly engage at least one of said member ends and to tightly interengage said edges with the respective shoulders.

The seal means as described may be used with any of a large variety of flange and coupling designs and other types of joints and connections.

I claim:

1. In a sealed connection for two cylindrical members defining an axis, an in combination with said members, the combination comprising (a) at least two semi-cylindrical connector sections sized to fit about said members, said sections forming multiple projections that extend radially inwardly and generally annularly about said axis, said projections spaced apart in an axial direction on each of the sections in meshing interengagement with corresponding projections on the members that project radially outwardly, with said sections bridging the joint between said members, whereby the members are held against relative axial separation, said projections in the sections having annular extents about said axis, and (b) generally annular retaining ring means extending annularly about said sections and having wedging engagement therewith to block outward movement of the sections that would tend to relieve such meshing interengagement, (c) there being sealing means at the joint between the members and compressed by the members when the sections are fully assembled thereto, (d) said sections having mid-portions bridging said joint between the members, certain of said projections located on one axial side of said mid-portions, and others of said projections located on the opposite axial side of said mid-portions, said certain and other projections having first annular flanks facing away from said joint and angled radially inwardly and generally toward said joint, and second and opposite annular flanks which face toward the joint and extend generally radially inwardly, the angularities of said first flanks from planes normal to said axis being substantially greater than the angularities of said second flanks from planes normal to said axis, said second flanks angled at no greater than about 5° from planes normal to said axis, (e) there being external shoulders on said members and facing endwise axially oppositely away from the joint to receive application of clamping force acting to urge the members axially toward one another into positions to allow said meshing, whereby the ring means may be moved axially to provide said wedging engagement, said shoulders located in substantial alignment with said projections.

2. The combination of claim 1 wherein said retaining ring means includes a ring having an axially tapered bore, and said sections have outer surfaces which are axially tapered to fit said tapered bore.

3. The combination of claim 1 including adjustable tongue and groove interconnections between said retaining ring means and said sections to lock the ring to said sections.

4. The combination of claim 1 wherein said retaining ring means includes two rings having bores which taper in axially opposite directions, and said sections having outer surfaces which taper in axially opposite directions to fit said tapered bores, respectively.

5. The combination of claim 1 wherein said seal means includes an annular metallic ring engaging the opposite ends of said members radially inwardly of said section mid-portions, said metallic ring having conical bores engaging the ends of the members to center same, coaxially.

6. The combination of claim 5 wherein said seal means also includes a non-metallic O-ring engaging the opposite ends of said members radially inwardly of said metallic ring.

7. The combination of claim 1 including clamp means engaging said shoulders and also spaced radially outwardly of said sections to allow application of the sections to the members while the clamp means engages said shoulders.

8. The combination of claim 1 wherein said members comprise pipes.

9. The combination of claim 8 wherein there are only two of said sections, each extending approximately half way around said axis.

* * * * *